United States Patent [19]

Bowen et al.

[11] 4,386,109
[45] May 31, 1983

[54] MICROWAVE EXPRESSO COFFEE MAKER AND PROCESS

[75] Inventors: Robert F. Bowen, Burlington; George Freedman; Wesley W. Teich, both of Wayland, all of Mass.

[73] Assignee: Raytheon Company, Lexington, Mass.

[21] Appl. No.: 238,251

[22] Filed: Feb. 25, 1981

[51] Int. Cl.³ .................. A23F 5/26; A47J 31/02; A47J 31/24
[52] U.S. Cl. ..................... 426/241; 99/292; 99/295; 99/302 R; 99/307; 99/451; 219/10.55 E; 219/10.55 R; 219/10.55 M; 426/433
[58] Field of Search ............... 426/241, 433, 435; 99/302 R, 295, 307, 306, 290, 451, 292, 296, 99/300; 219/10.55 E, 10.55 R, 10.55 M

[56] References Cited

U.S. PATENT DOCUMENTS

| | | | |
|---|---|---|---|
| 1,083,900 | 1/1914 | Brown | 99/295 |
| 1,964,151 | 6/1934 | Guntrup | 99/306 |
| 2,176,082 | 10/1939 | Kise | 426/433 |
| 2,601,067 | 6/1952 | Spencer | 219/10.55 E |
| 2,794,106 | 5/1957 | Andres et al. | 99/306 |
| 2,887,038 | 5/1959 | Rosander | 99/307 |
| 3,030,874 | 4/1962 | Fiori | 99/295 |
| 3,333,527 | 8/1967 | Bender | 99/306 |
| 3,336,857 | 8/1967 | Knodt et al. | 99/296 |
| 3,442,199 | 5/1969 | MoGrail | 99/306 |
| 3,444,804 | 5/1969 | Stozek | 99/302 R |
| 3,518,933 | 7/1970 | Weber | 99/302 R |
| 3,589,272 | 6/1971 | Bouladon et al. | 99/295 |
| 3,599,557 | 8/1971 | Leal | 99/302 R |
| 4,104,957 | 8/1978 | Freedman et al. | 219/10.55 E |
| 4,143,590 | 3/1979 | Kasakoff | 99/306 |
| 4,158,329 | 6/1979 | McKnight | 426/80 |
| 4,167,899 | 9/1979 | McCormick | 99/302 R |

OTHER PUBLICATIONS

Condensed Chem. Dictionary-8th Ed., Hawley, Van Nostrand Reinhold Co., 1971.

*Primary Examiner*—Steven L. Weinstein
*Attorney, Agent, or Firm*—William R. Clark; Joseph D. Pannone

[57] ABSTRACT

An expresso coffee maker for use in a microwave oven. The water is stored in a microwave transparent reservoir or container which is adjacent to the pot. The pot and reservoir are coupled in a fixed spacial relationship by a collar. The collar includes a strainer which presses against a layer of coffee grounds when the collar is rigidly secured to the reservoir. The compressed coffee grounds in combination with the strainer form a pressure resistant seal over the opening of the reservoir. The water in the reservoir is heated by microwave energy. The pressure rises to a level sufficient to force steam and water through the coffee grounds into the pot.

18 Claims, 5 Drawing Figures

MICROWAVE EXPRESSO COFFEE MAKER AND PROCESS

BACKGROUND OF THE INVENTION

Expresso beverages, such as, for example, expresso coffee are very popular. The method for making expresso coffee is different than the common methods for making drip-type or percolation coffee. More specifically, the expresso process which may have originated in Naples, Italy, involves forcing hot water or steam under pressure through a packed particulate substance. Although the particulate substance may be conventional coffee grounds, it is much more common to use extra fine grounds from a special expresso bean that has been triple roasted and has a distinct dark or burnt coloring. The particulate substance may also include a mixture such as expresso coffee grounds and cinnamon. Expresso coffee is a dark full bodied brew and may also be served as cappucino.

Because of the different type of method for making expresso beverages, a special type of maker or utensil designed for that function is required. More specifically, a pressurizable reservoir and means for holding the tightly packed particulate substance are needed. Furthermore, the expresso makers in use today are not adapted for operation in a microwave oven.

SUMMARY OF THE INVENTION

The invention discloses the method of making a beverage in a microwave oven comprising the steps of sealing a fluid in a pressurizable microwave transparent container, forming a pressure resistant path from the container through a particulate substance, and heating the fluid with microwave energy to raise the pressure in the container. It may be preferable that the particulate substance comprise expresso coffee grounds. Also, it may be preferable that the fluid be water. Furthermore, the container may comprise polycarbonate. The pressure resistant path may provide pressure resistance in the range from 6 to 50 pounds per square inch. By pressure resistant path, it is meant that at atmospheric pressure, substantially no fluids will pass along the path. However, at a particular pressure above atmospheric, the fluids will follow the path through the particulate substance. The pressure resistant path may form part of the seal for the pressurizable microwave transparent container.

The invention also discloses the method of making a beverage in a microwave oven comprising the steps of placing a fluid in a pressurizable microwave transparent container through an opening therein, providing a sealed path from the opening through a particulate material, and heating the fluid with microwave energy to raise the pressure within the container. Stated differently, the invention may be practiced by the method of making a beverage in a microwave oven comprising the steps of placing a fluid in a pressurizable microwave transparent container having an opening, providing a pressure resistant sealed path from the opening through a particulate substance, and then heating the fluid with microwave energy to raise the pressure within the container so as to force the fluid or steam through the particulate substance. By microwave transparent, it is meant that microwave energy will pass through the material without substantial loss. Stated differently, the container will not reflect or absorb microwave energy to any substantial degree.

The invention may be practiced by a pressurizable microwave transparent container having an opening and means surrounding the opening and removably connected to the container for forming a pressure resistant path from the opening, the forming means comprising means for holding a particulate substance. The pressure resistant path may provide pressure resistance in the range from 6 to 50 pounds per square inch above atmospheric at which time fluids may pass along the path. The holding means may comprise two perforated metallic plates disposed in a spaced relationship.

The invention discloses a pressurizable microwave transparent container having an opening and means removably connected to the container for sealing the opening, the sealing means comprising means for holding a particulate substance. It may be preferable that the microwave transparent container comprise polycarbonate. Also, it may be preferable that the holding means comprise two perforated plates disposed in a spaced relationship. Furthermore, the holding means may comprise means for disposing a layer of the particulate substance substantially parallel to the cross-section of the opening.

The invention may further be practiced by a pressurizable microwave transparent container having an opening and means for forming a pressure resistant path from the opening, the forming means comprising two spaced perforated metallic plates. The forming means may further comprise a particulate substance such as, for example, expresso coffee grounds.

The invention discloses a utensil for making a hot beverage in a microwave oven comprising a pressure chamber comprising a microwave transparent substantially cylindrical container having one end closed and one end open, the chamber further comprising means for sealing the open end, the sealing means comprising a collar removably connected to the container and means for forming a layer of particulate substance substantially filling the cross-sectional area of the collar with the forming means comprising a perforated plate. Furthermore, the container may comprise a pressure release valve.

Also, the invention may be practiced by a utensil for making expresso coffee in a microwave oven comprising a substantially cylindrical container having one end open and the other end sealed, the container being transparent to microwave energy, means removably connected to the container for forming a sealed collar around the opening, means removably positioned in the collar for forming a layer of particulate substance perpendicular to the length of the collar, the layer forming means comprising a perforated metal plate, and a microwave reflective pot coupled to the collar. Furthermore, the utensil may comprise a plurality of channels between the collar and the pot for preventing a buildup of pressure in the pot.

BRIEF DESCRIPTION OF THE DRAWINGS

The invention will be more fully understood by reading the description of the preferred embodiment with reference to the drawings wherein.

DESCRIPTION OF PREFERRED EMBODIMENT

Figure 1:
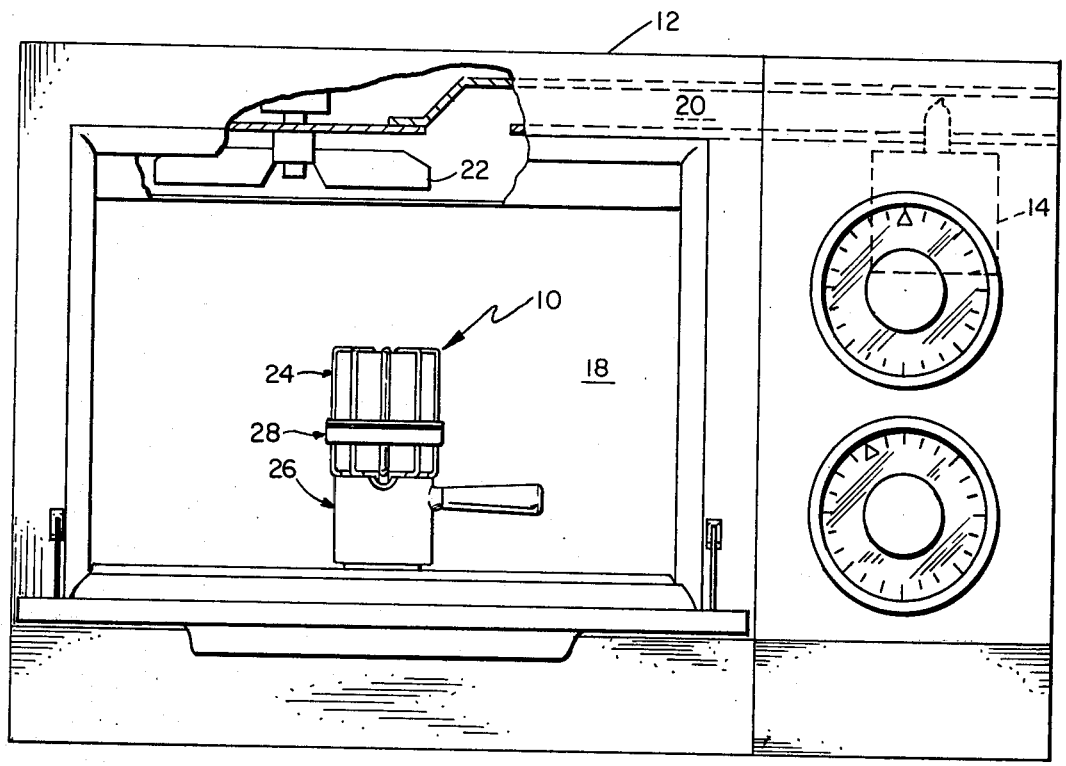
FIG. 1 is a microwave expresso coffee maker embodying the invention, the maker being positioned in a conventional microwave oven.

Referring to FIG. 1, there is shown a microwave expresso coffee maker 10 embodying the invention. The maker 10 is positioned in a conventional microwave oven 12. Microwave energy typically of a frequency of approximately 2450 megahertz is provided by magnetron 14 which is connected to and receives DC power from a power supply not shown. The microwave energy is coupled to cavity 18 by waveguide 20 and mode stirrer 22 or more preferrably a directive antenna (not shown). Other conventional microwave oven parts and features such as, for example, the door seal, are not shown and described as they are well known in the art.

Figure 2:
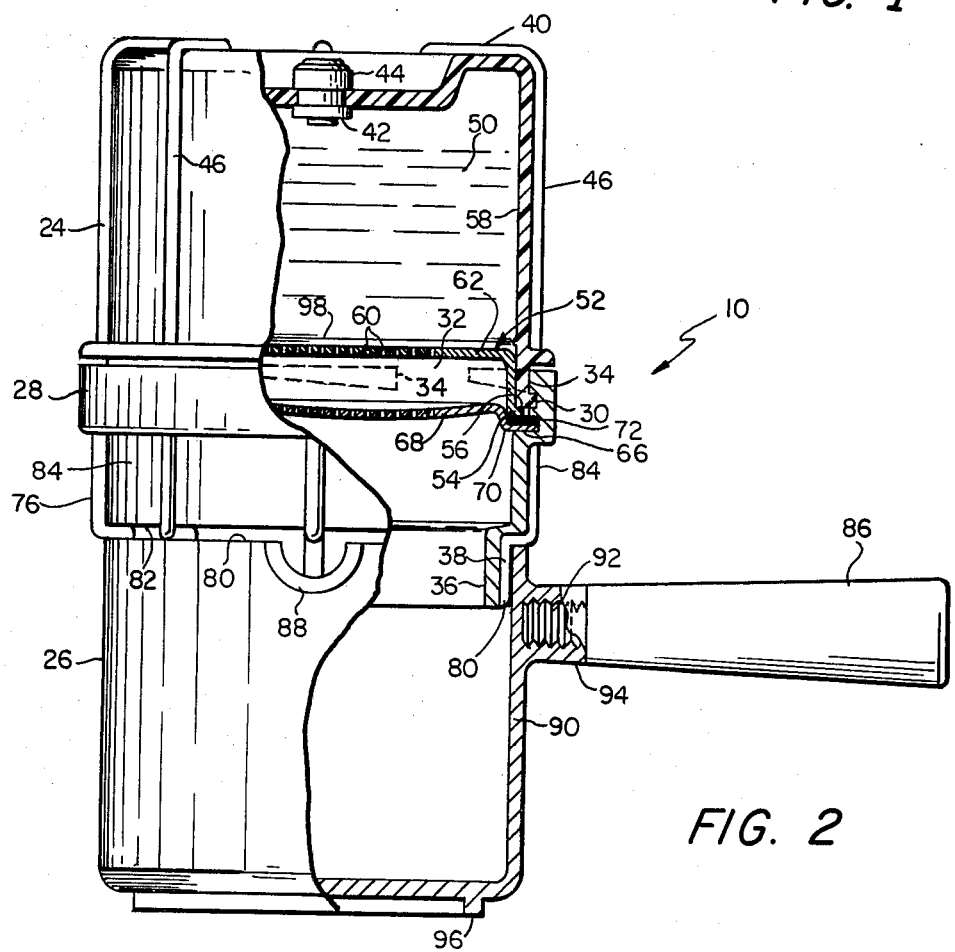
FIG. 2 is an expanded partially cut away elevation view of the maker of FIG. 1.

Referring to FIG. 2, an expanded partially cut away view of the expresso coffee maker 10 or apparatus is shown. Maker 10 includes an upper container, lower container, and middle section. Generally, the upper container or reservoir 24 provides a pressure chamber for the water before the coffee making process is initiated. The lower container or pot 26 is where the expresso coffee is stored after the coffee making process. The middle section or collar 28 houses the coffee grounds and also structurally couples the reservoir 24 and pot 26 in fixed alignment. More specifically, reservoir 24 which is removable from collar 28 is rigidly secured thereto by directing threads 30 on the outside of reservoir 24 into slots 32 of collar 28 and twisting the reservoir with respect to the collar until threads 30 tightly engage matching threads 34 on the inside of the collar. Furthermore, the collar provides a seal for reservoir 24. Also, the bottom cylinder 36 of the collar has a plurality of ridges 38 protruding from the outer surface. The diameter of a circle encompassing the plurality of ridges 38 is slightly smaller than the inner diameter of pot 26. Accordingly, the bottom cylinder of the collar may be slid into the top of the pot thereby rigidly coupling the two members from independent horizontal motion as shown in FIG. 2.

Reservoir 24 is fabricated of polycarbonate. Other microwave transparent materials could be used but they must also exhibit the strength and high temperature resistive properties of polycarbonate. More specifically, as described later herein, the water in reservoir 24 reaches temperatures on the order of boiling water when exposed to microwave energy; accordingly, it is important that the material of reservoir 24 be resistant to temperatures of, for example, 230° F. Furthermore, for commercial success it is preferable that the material be resistant to such forces as impact and pressure. Reservoir 24 is cylindrical although other shapes could be used. One end 40 of reservoir 24 is sealed and has a pressure release valve 42 to insure that the pressure therein does not rise above a predetermined level. As will be described later herein, the reservoir is filled with water when in a position inverted from that shown in FIG. 2. Accordingly, end 40 is recessed so that the reservoir may be set on end 40 without the protrusion 44 of valve 42 interfering with stability. Ribs 46 provide easy grip of reservoir 24 when twisting with respect to collar 28 for engaging and disengaging the two members and also provide additional reservoir strength for pressure therein.

In preparation for making expresso coffee using maker 10, collar 28 and reservoir 24 are removed from pot 26 by sliding upwards from the position shown in FIG. 2. Then, collar 28 and reservoir 24 are disengaged by twisting counter-clockwise with respect to each other until threads 30 may be removed through slots 32.

Figure 3:
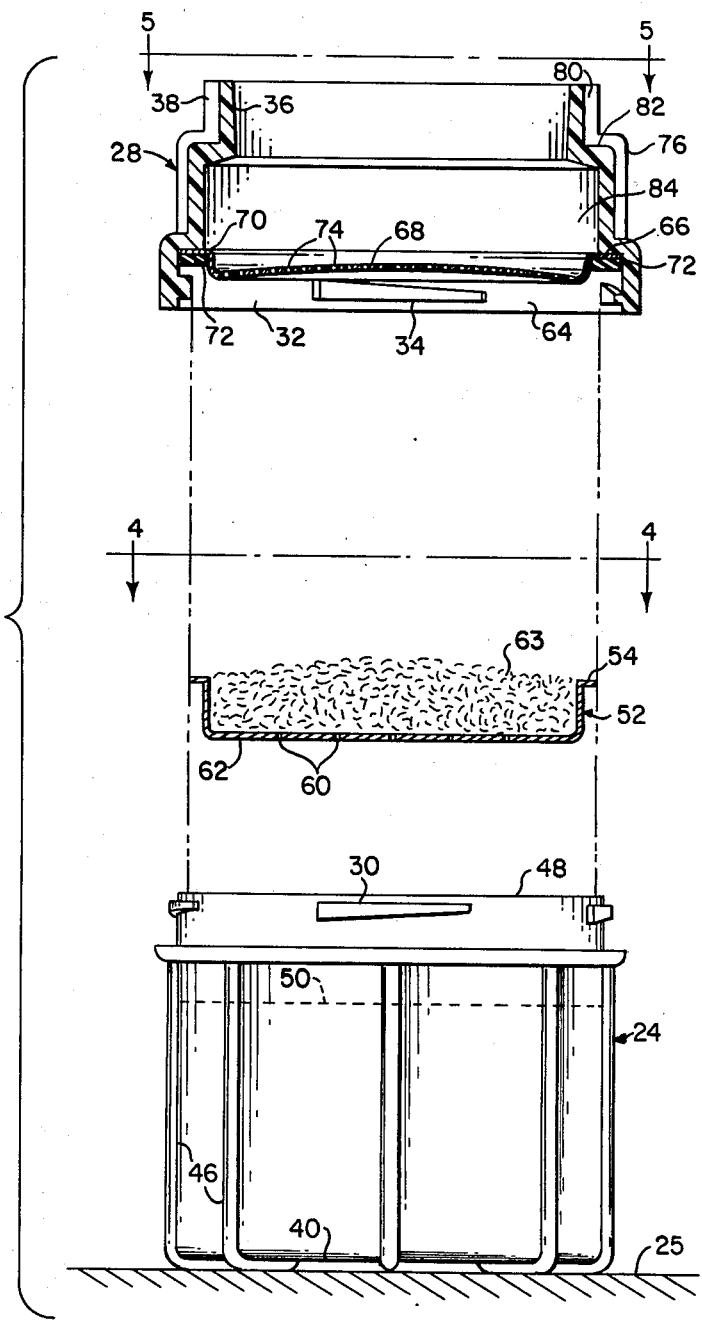
FIG. 3 is a partially cut away view of the reservoir, basket, collar, strainer, and gasket of the maker of FIG. 2.

Reservoir 24 is inverted to the position as shown in FIG. 3 and placed on a flat surface 25 for convenience. With the open end 48 of reservoir 24 upward as shown, water 50 is poured into the reservoir. The amount of water used may be a function of the size of the expresso maker and the desired strength and temperature of the brewed coffee. For example, it is common in the industry to consider a cup of expresso coffee to be 2.5 ounces of water. Therefore, for a two cup coffee maker, approximately five ounces of water would be poured into the reservoir. For a larger size coffee maker requiring more coffee grounds, more than five ounces of water would be added.

Figure 4:
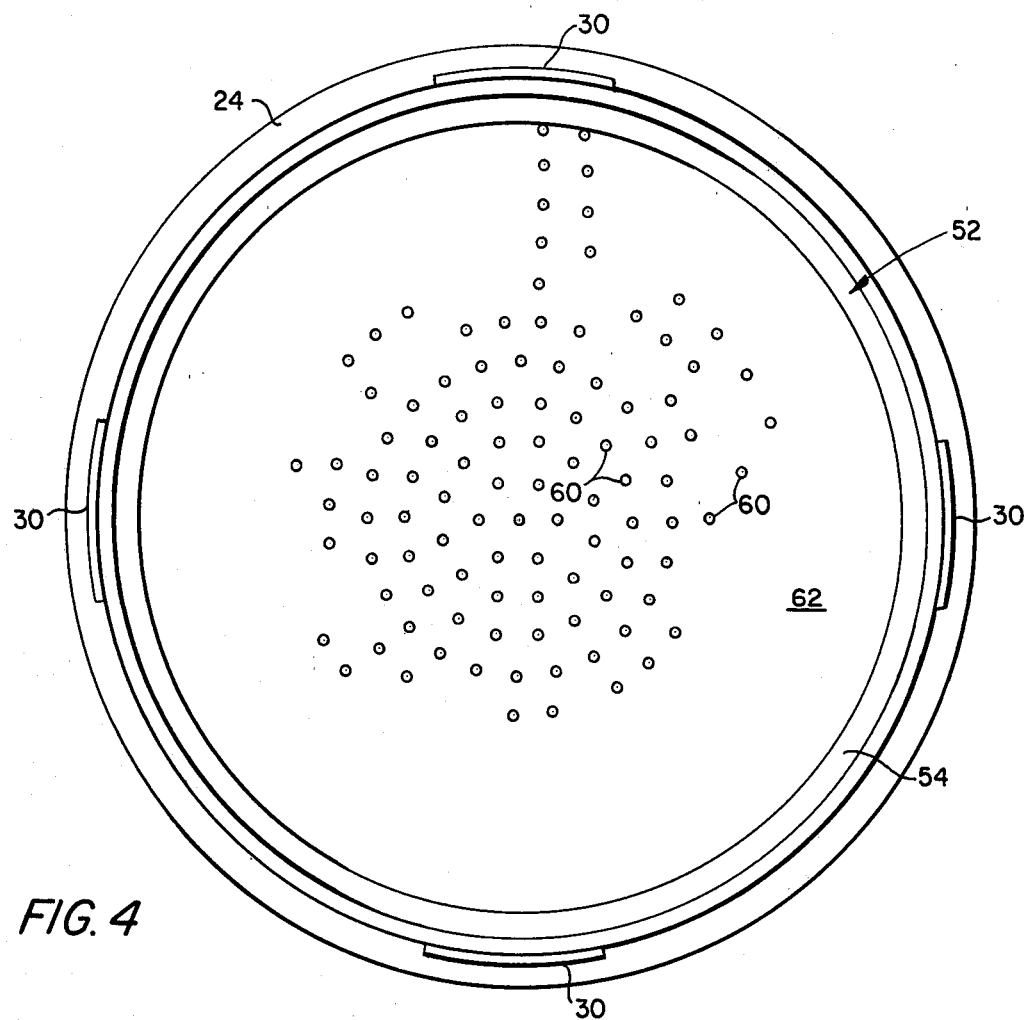
FIG. 4 is a view taken along line 4—4 of FIG. 3.

After the water is added, coffee grounds basket 52 is placed into reservoir 24 until flange 54 contacts the lip 56 of reservoir 24. It may be preferable that there be a clearance of 0.010 inches between the outer cylindrical surface of basket 52 and the inner cylindrical surface 58 of the reservoir. Basket 52 has a plurality of perforations 60 in disc 62 so that in operation water under pressure may be forced from the reservoir into the interior of the basket and through the coffee grounds. One advantageous pattern for perforations is an arrangement into ten concentric circles from the center of disc 62, the successive circles having 1,6,12,18,24,30,36,42,48, and 54 perforations, each perforation having a diameter of 0.040 inches and the successive concentric circles differing in radius by 0.262 inches. FIG. 4 is illustrative of this example. One skilled in the art will recognize that many different patterns could be used to advantage with the invention. The basket is fabricated of aluminum although other metallic or microwave reflective materials could be used.

The next step in preparing the coffee maker for use is to place expresso coffee grounds 63 into basket 52 to a slight overflow level. It is preferable that the grounds be compressed in basket to form a pressure seal for the water in the reservoir. The compression may preferably be attained by packing the grounds using an object such as the back of a spoon and/or by the force of tightening the collar with strainer 68 down onto the reservoir. Collar 28 is engaged to reservoir 24 by moving the members so that threads 30 insert through slots 32 and twisting clockwise with respect to the other member. Inside the end of the collar that engages the reservoir, there is an inner cylinder section 64 having a large diameter than the adjacent section thereby defining a lip 66. A strainer 68 is positioned in section 64 and has a circular flange 70 which contacts lip 66. The strainer may be removed past threads 34 on the inside of section 64 for cleaning. Also, ring gasket 72 is positioned around the perimeter of strainer 68. The gasket may preferably be made of silicon rubber. It must be food grade, resistant to temperatures of at least 212° F., and be transparent to microwave energy. When the collar is engaged to reservoir 24 by twisting, threads 30 and 32 draw down forcing the strainer 68 in the direction of the grounds basket 52. Accordingly, the grounds which were filled into basket 52 to a slight overflow are compressed into a layer forming a seal over the opening of the reservoir. The engaged reservoir and collar can now be turned over or inverted without the water running out; the gasket 72 seals the cross-sectional area of the reservoir outside basket 52 and the compressed grounds seal the exit through perforations 60.

Figure 5:
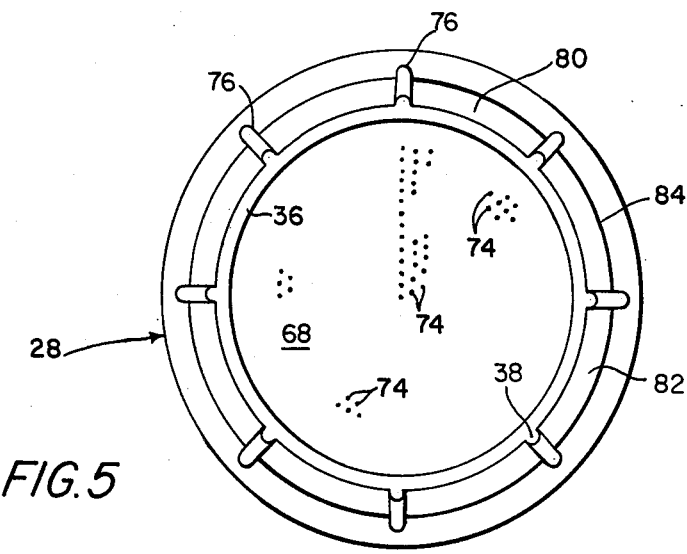
FIG. 5 is a view taken along line 5—5 of FIG. 3.

Strainer 68 has a plurality of perforations 74. An example of a preferable pattern is an arrangement into fifteen concentric circles respectively having 1,6,12,18,24,30,36,42, 48,54,66,72,78,84, and 90 perforations, each perforation having a diameter of 0.024 inches and the concentric circles having successive radius differences of 0.160 inches. FIG. 5 is illustrative of this example. It is preferable that the total area of perforations 60 in the basket be greater than the total area of perforations 74 in the strainer. Accordingly, the pressure in the reservoir at which steam and water are forced through the coffee grounds is substantially maintained through the coffee grounds to the strainer 68 which is the point of highest pressure resistance. The strainer may be convex with respect to the grounds basket as shown to provide better flow through the coffee grounds and to provide structural strength for compressing the coffee grounds when engaging the collar and reservoir. Strainer 68 is made of aluminum although other metal or microwave reflective materials could be used. In the operational configuration, the coffee grounds are enclosed by the combination of basket 52 and strainer 68. Accordingly, because the perforations in the basket and strainer are small enough that microwave energy will not pass therethrough, the grounds are substantially shielded from microwave energy. Ridges 76 on the outside of collar 28 provide a grip for twisting the collar with respect to the reservoir for engaging and disengaging therewith. Ridges 38 on collar cylinder 36 that couples into pot 26 function to provide channels 80 between the collar and the pot so that vapor can escape from the pot therethrough. Ridges 76 protrude from surface 82 so that the collar is slightly elevated from the pot when coupled to it so that channels 80 communicate outside the maker 10. Preferably, the collar is fabricated of polycarbonate.

Pot 26 is aluminum and has a capacity larger than the amount of water placed in reservoir 24. During the coffee making process when expresso coffee in being forced into the pot, substantial shielding from microwave energy is provided for the coffee by the aluminum pot. Because the aluminum strainer 68 and basket 52 prevent the propagation of energy directly downward into the pot, the only path for microwave energy into the coffee is by a downward angle through the central section side 84 of collar 28. Accordingly, only a very small percentage of the microwave field in the cavity is distributed to the interior of the pot. Nonmetallic or microwave transparent materials could be used to fabricate the pot. In such case, continued radiation of microwave energy after the coffee is brewed would be absorbed by the coffee resulting in a different taste. However, because the continued radiation will typically be of relatively short duration, the change in taste may not be significant. Handle 86 is used to pour coffee from spout 88 after it is made. Handle 86 may be made of polycarbonate and attached to the wall 90 of pot 26 by screwing threads 92 thereon into a threaded bracket 94. Polycarbonate may be preferable because it is microwave transparent, a good thermal insulator, and strong. Pot 26 may be raised off its support surface by a protruding base 96 or legs (not shown).

In operation, after maker 10 is assembled as described above with water in the reservoir and coffee grounds packed between the basket and strainer, the maker is positioned in a microwave field for a predetermined time period such as, for example, two minutes for a five ounce size. Because reservoir 24 is transparent to microwave energy, the water therein rapidly heats toward boiling. As the water and the air trapped in the reservoir heat, the pressure within the reservoir rises. At a particular pressure which may be a function of the size and number of perforations in basket 52 and strainer 68 and the characteristics and degree of packing of the coffee grounds, water is forced through perforations 60, coffee grounds, and perforations 74 into pot 26. The process of forcing hot water or steam under pressure through compressed or packed coffee grounds in a time period which is short compared to drip coffee provides the expresso coffee. The pressure created in pot by the incoming coffee and vapors is released through channels 80. After the expresso coffee is made, the collar with reservoir attached is removed from the pot providing access to pour from spout 88. It was found that when filling the reservoir with water, it was preferable to fill it to a fill line 98 which is close to the bottom of the basket when seated therein. When less water was added, the temperature of the brewed coffee was substantially reduced; with a higher air to water ratio, the pressure to force flow through the grounds was reached at a lower water temperature. More specifically, the distance between the fill line and bottom of the seated basket was 0.062 inches. As examples, when water is filled to the fill line, the coffee brew using an aluminum pot was approximately 180° F. When water was filled 0.5 inches below the fill line, the brewed coffee was only 150° F.

Pressure valve 42 positioned in end 40 of reservoir 24 may preferably be a spring loaded ball type pressure release valve. More specifically, it may be a conventional valve which releases pressure from reservoir when the internal pressure therein reaches approximately 12.5 pounds per square inch above atmospheric. Furthermore, it has been found preferable that the pressure described heretofore at which the water is forced through the coffee grounds be approximately 8 pounds per square inch above atmospheric. Accordingly, if for some reason the pressure created inside reservoir 24 were not relieved in the direction of the coffee grounds, the pressure would be relieved through valve 42 when it reached approximately 12.5 pounds per square inch above atmospheric. Accordingly, maker 10 described herein operates with a high degree of safety. Furthermore, the coffee is not adversely affected to any significant degree if the microwave oven is left on for a time period longer than necessary to force the water from the reservoir through the grounds into the pot. More specifically, the coffee in the pot as described earlier herein is substantially shielded from microwave energy so that it will not boil as a result of extended exposure to microwave energy.

To one skilled in the art the reading of this disclosure will bring to mind many modifications and alterations without departing from the spirit and scope of the invention. For example, a pressure resistant path through the basket, particulate substance, and strainer has been described herein, which path prevents the flow of water or steam until the pressure in the reservoir rises to approximately eight pounds per square inch above atmospheric. However, the pressure at which water and steam passes along the path could be substantially increased by changing the design parameters of the path components. If the maker were to begin operating at a higher pressure, the pressure at which the pressure release valve provides relief would also be increased. Also, the reservoir could be positioned at the bottom and the pot on top as has been done with prior art expresso makers for use with electric or gas stoves. Accordingly, it is intended that the scope of the invention not be limited by this description of the preferred embodiment but rather, only by the appended claims.

What is claimed is:

1. The method of making espresso coffee in a microwave oven comprising the steps of:
   pouring a fluid into a substantially cylindrical pressurizable microwave transparent container having an open end on top surrounded and defined by a lip on the container;
   inserting a perforated metal basket in said container through said open end, said basket having a flange seated on said lip of said open end wherein the bottom of said basket is supported slightly above said fluid;
   positioning a heaping supply of coffee grounds in said basket;
   securely attaching a ring collar to said container, said ring collar having a perforated metal plate covering said open end and pressing downwardly on said grounds, compressing said grounds between said basket and said plate;
   inverting said container, metal basket, and attached ring collar, said fluid being retained in said container by the size of the perforations in the perforated metal basket and plate and said compressed grounds; heating said fluid in said inverted container with microwave energy to raise the pressure within said container wherein said fluid is forced through said perforated metal basket and plate and said grounds to make espresso coffee;
   collecting said espresso coffee in a metallic pot within the field of said microwave energy wherein the beverage produced is shielded from said microwave energy; and
   providing for the rapid escape of gases from said pot.

2. The method in accordance with claim 1 wherein said particulate material comprises expresso coffee grounds.

3. The method in accordance with claim 1 wherein said fluid is water.

4. The method in accordance with claim 1 wherein said container comprises a polycarbonate cylinder having one end closed.

5. The method of making espresso coffee in a microwave oven comprising the steps of:
   placing a fluid in a pressurizable microwave transparent container through a circular top opening;
   covering said opening with a layer of coffee grounds compressed between two metal perforated disks;
   inverting said container said fluid being retained in said container by the size of the perforations in said perforated disks and said layer of compressed coffee grounds;
   heating said fluid with microwave energy to raise the pressure within said container wherein said fluid is forced through said perforated disks and said coffee grounds to make espresso coffee;
   collecting said espresso coffee in a metallic pot within the field of said microwave energy thereby shielding said espresso coffee from said microwave energy; and
   providing for the rapid escape of gases from said pot.

6. The method in accordance with claim 5 wherein said material comprises expresso coffee grounds.

7. The method in accordance with claim 5 wherein said particulate substance layer is resistant to approximately eight pounds per square inch of pressure.

8. The method in accordance with claim 5 wherein said fluid is water.

9. The method in accordance with claim 5 wherein said container comprises a polycarbonate cylinder having one end closed.

10. A utensil for making a hot beverage in a microwave oven comprising:
    a pressure chamber for holding a fluid, said chamber comprising a microwave transparent substantially cylindrical container having one closed end and one opened end;
    said chamber further comprising means for covering said opened end;
    said covering means comprising a collar removably connected to said container;
    said covering means further comprising a layer of coffee grounds substantially filling the cross-sectional area of said collar, said layer being compressed between two spaced plates having perforations therein;
    a metallic pot supporting said chamber with said closed end of said chamber being top most, said fluid being retained in said chamber by said compressed coffee grounds and said perforations said pot providing a microwave energy shielded reservoir for collecting espresso coffee made by heating said fluid with microwave energy until pressure in said container forces said fluid through said coffee grounds into said pot; and
    means for venting gases from said pot, said venting means comprising a plurality of channels formed between the outside of said collar and the inside of said pot, said channels around the perimeter of said pot.

11. The utensil recited in claim 10 wherein said container comprises polycarbonate.

12. The utensil recited in claim 10 wherein said collar comprises polycarbonate.

13. The utensil recited in claim 10 wherein said container comprises a pressure relief valve.

14. The utensil recited in claim 10 wherein said particulate substance is expresso coffee grounds.

15. A utensil for making expresso coffee in a microwave oven comprising:
    a substantially cylindrical container for holding a fluid, said container having one end open and the other end sealed, said container being transparent to microwave energy;
    a perforated metal coffee grounds basket positioned in said container, said basket having a flange seated against the lip of said open end of said container;
    a collar removably connected to said container for providing a cover for said open end of said container;
    means removably positioned in said collar for compressing a layer of coffee grounds contained in said basket, said compressing means comprising a perforated metal plate spaced from the bottom of said basket, said layer providing a substantial vapor seal of said open end of said container;
    a microwave reflective pot coupled to said collar with raid covered open end downward, said pot providing a microwave energy shielded reservoir for collecting espresso coffee made by heating said fluid with microwave energy until pressure in said container forces said fluid through said grounds into said pot; and said collar having a plurality of ribs for forming channels between the inside of said pot and the outside of said collar, said channels venting gases from said pot when said fluid is forced into said pot.

16. The utensil recited in claim 15 wherein said container comprises polycarbonate.

17. The utensil recited in claim 15 wherein said collar comprises polycarbonate.

18. The utensil recited in claim 15 wherein said container comprises a pressure relief valve.

* * * * *